March 30, 1937.  J. F. WATSON  2,075,073
ELECTRIC CABLE
Filed March 11, 1930

INVENTOR.
John F. Watson
BY
Kiddle, Margeson and Horridge
ATTORNEYS.

Patented Mar. 30, 1937

2,075,073

UNITED STATES PATENT OFFICE 2,075,073

ELECTRIC CABLE

John Francis Watson, Belvidere, England, assignor to The Okonite-Callender Cable Company, Incorporated, Paterson, N. J., a corporation of New Jersey Application March 11, 1930, Serial No. 434,854

4 Claims. (Cl. 171—97)

This invention relates to an improvement in cables, and has for one of its objects the provision of a construction whereby increase of the oil pressure within the insulation of the cable to a detrimental extent is prevented, or at least is reduced to a minimum.

When electric cables are carrying current, heat is generated on account of the electrical resistance of the conductor directly proportional to the square of the current and the electrical resistance of the conductor or conductors. As a result of this generation of heat the temperature of the conductor of the cable and its insulation is increased.

In the case of electric cables employing oil impregnated paper as insulation this generation of heat causes a volumetric increase in the oil contained in the cable or insulation of the cable and inasmuch as in practice the insulation is surrounded by an impermeable lead sheath, and inasmuch as the nature of the paper used is such that the oil has no quick means of migrating to a place which will take up the increase in volume, such as to the joints of the cable, a substantial increase in oil pressure is created in the cable which may be sufficiently great to cause stretching of the lead sheath. When the cable cools down, as the current carried therein is decreased, the oil volume is of course reduced, which causes voids to form in the cable resulting ionization or corona which eventually results in destruction of the insulation and the consequent failure of the cable.

If the cable can be operated in such a way as to limit the change in temperature or even to hold it constant then the formation of voids from this source will be prevented and the possibility of failure of the cable from this cause eliminated. In other words, if the temperature range over which the cable operates is kept within narrow limits the operation of the cable is improved.

In order to accomplish this end I propose to split the conductor into two parts or sections which are substantially at the same potential but insulated from each other.

Figure 4:
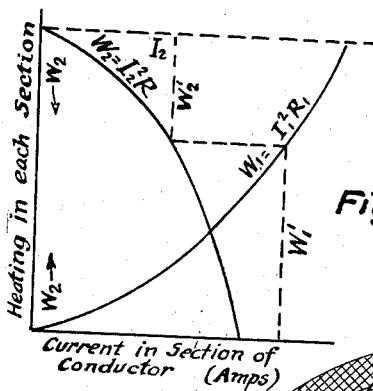
Fig. 4 is a diagram illustrating the heating produced by the currents in the cable sections.

Referring to the drawing, one part or section of the conductor is designated 1, the other part or section being designated 2; 1 being the inner section and 2 the outer section. The cable illustrated is a single conductor cable. The part or section 1 is separated from the part or section 2 by insulation 3 although when operating the cable the parts 1 and 2 are at substantially the same electric potential. Surrounding the outer part or section 2 of the cable is the main insulation of the cable which has been designated 4. Surrounding this insulation is the grounded lead sheath 5.

Figure 2:
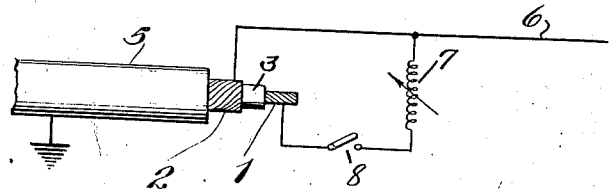
Fig. 2 is a further and more diagrammatic illustration of my invention.

In actual operation the part 1 and part 2 carry the current load and divide the total current between each other in proportion to their respective resistances and whatever means is provided at the ends of the cable to assist in this division. For example, variations in load can be compensated for by reactances to cause either section to carry a given amount of current and the other section the remaining amount of current, as illustrated in Fig. 2. In other words, these reactances or whatever other form or type of apparatus may be employed can be used to cause the section 1 to carry any desired current and the other section to carry the remaining amount of current. In Fig. 2, 6 leads from a source of power. 7 is a variable reactance inserted in series with inner conductor section 1 in order to vary the impedance of it with respect to the outer conductor section 2, thereby varying the division of current between the two parts of the split conductor. 8 is a switch, such as an oil circuit breaker, which is also inserted in series with the inner conductor section 1 so that it can be put into circuit to carry current or taken out so as to permit all of the current to pass through the outer conductor section 2. It will be understood that if desired resistances can be substituted for the reactance 7.

The maximum difference in potential between the two sections will be the difference in voltage drop along the two sections of the conductor. This will be equal to the voltage drop across the variable reactance 7. The two sections 1 and 2 will be at the same potential at the receiving end of the line and will be connected together at that point. This reactance may be located at the receiving end of the line or at any point along the line if desired, but I find it more convenient to locate it at the source of the power.

Let us assume that $I_1$ is the current in the inner section 1 and $I_2$ the current in the outer section 2; $R_1$ is the electrical resistance of the inner section 1 and $R_2$ the electrical resistance of the outer section 2. With this premise it will be understood that the heating is a function of $I_1^2 R_1 + I_2^2 R_2$. If $R_1$ which is the electrical resistance of the inner section 1 equals $R_2$ which is the electrical resistance of the outer section 2 and $I_1$ which is the current in the inner section equals $I_2$ which is the current in the outer section, then the heating would be the same for both sections. Let us assume that $W$ equals $I_1^2 R_1 + I_2^2 R_2$. Then if it is desired to keep $W$ constant as the load changes, say for instance decreases, the amount of current carried in one section, the section 1 for instance, can be decreased and the current carried in the other section, for instance section 2 increased so that the sum expressed above is still equal to $W$. In other words, the temperature is constant.

Figure 3:
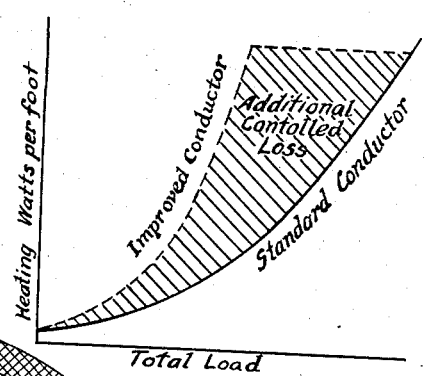
Fig. 3 is a diagram illustrating the losses in watts for a standard single conductor cable and for a cable of my design.
Figure 1:
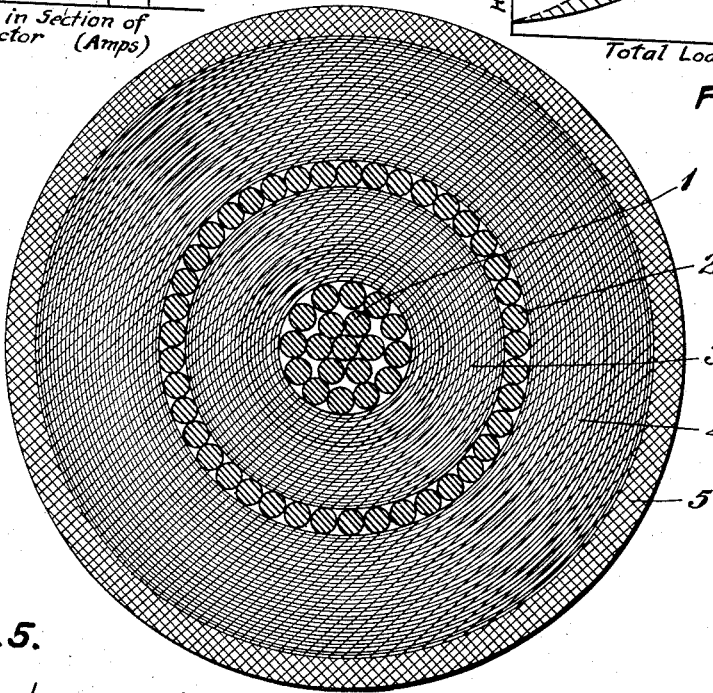
Fig. 1 is a cross section of a cable constructed in accordance with my invention.
Figure 5:
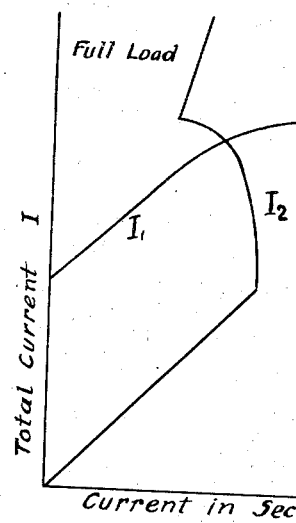
Fig. 5 is a curve obtained from Fig. 4.

Referring to the curves of Figures 3, 4 and 5:

In Figure 3 the losses in watts are shown for a standard single conductor cable and for a cable of my design. The shaded area shows the additional losses which maintain constant temperature over a considerable range of load. This range may, of course, be varied by altering the resistances of the sections.

Figure 4 shows the heating produced by the currents in the sections. $W_2$ is plotted inverted so as to facilitate use of this curve. Assume a current $I_1^1$ in the inner conductor 1. The loss determined from this curve is $W_1^1$. To maintain constant heating the loss in the outer conductor must be $W_2^1 = W - W_1^1$. This is shown on the curve and is obtained from Figure 4 by drawing a horizontal line. The current in the outer conductor 2 is determined from the intersection of this line with the proper curve. This may be done for any value of $I_1$.

Figure 5 is derived from Figure 4 and gives $I_1$ and $I_2$ directly for any value of total current I.

It is seen that up to a certain point the total current flows in the outer section. From this point up to full load the current is controlled to give constant heating. Above full load the heating increases. The range of controlled current may be varied by changing the resistances of the sections as explained above.

Either section may carry the greater proportion of current to obtain constant value of $W$ although practicably I would use the outer section 2.

It is not necessary to have the conductor divided into two equal parts, in fact under commercial practice the outer conductor would probably be of smaller cross section than the inner section 1 and therefore of a higher electrical resistance.

In actual operation the division of currents would be determined from the maximum total current to be carried and the division of the cross sectional area between the inner and outer sections 1 and 2. As the current varied from this maximum value a greater proportion would be carried by the outer section in order to obtain a constant amount of generated heat. As the current decreased the condition could be arrived at where all of the current would be carried by the outer section in order to obtain the maximum amount of heat generated.

When the current load on the cable falls to a low percentage of its permissible value if there is more than one cable in the circuit, that is, if there are several cables arranged in parallel and carrying the load, it is customary in practice to cut out of service some of the cables, transferring all the load to a fewer number, thereby keeping these cables up near their normal loading. This is done because of the fact that it is good for the cables, inasmuch as it helps to keep them at a constant temperature. Those cables taken out of service could be kept at a desired constant and operative temperature by sending a heating current through them; in such case a current of low voltage would be sent to the inner and outer sections of sufficient value to produce sufficient heat to maintain a constant temperature.

What I claim is:—

1. In combination with a source of electric energy, a split electric conductor, the sections of which are insulated from each other, connections for connecting said conductor sections to said source of electric energy, and variable means in series with said source of electric energy and one of the conductor sections for varying the current flowing in said section whereby without varying the current load on the cable and with current flowing in all of said sections the current load on one section may be varied with respect to the current load on another section.

2. In combination with a source of electric energy, a split electric conductor, the sections of which are insulated from each other, connections for connecting said conductor sections to said source of electric energy and a reactance for varying the current flowing in one of said sections with respect to the current flowing in another section, whereby without varying the current load on the cable and with current flowing in all of said sections the current load on one section may be varied with respect to the current load on another section.

3. In combination with a source of electric energy, a split electric conductor, the sections of which are insulated from each other, connections for connecting said conductor sections to said source of electric energy, and a resistance for varying the current flowing in one of said sections with respect to the current flowing in another section, whereby without varying the current load on the cable and with current flowing in all of said sections the current load on one section may be varied with respect to the current load on another section.

4. In combination with a source of electric energy, a split electric conductor, the sections of which are insulated from each other, connections for connecting said conductor sections to said source of electric energy, means for disconnecting one of said sections from said electric energy source whereby all of the current flows through the other conductor sections, and variable means in series with said source of electric energy and one of the conductor sections for varying the current flowing in said section without varying the current load on the cable and with current flowing in all of the conductor sections to effect a variation in the current load on one section with respect to the current load on the other conductor sections.

JOHN FRANCIS WATSON.